United States Patent
He et al.

(10) Patent No.: US 7,719,667 B2
(45) Date of Patent: May 18, 2010

(54) ESTIMATING LOSS OF MECHANICAL SPLICES INTERCONNECTING OPTICAL FIBERS, AND CONNECTOR INSTALLATION TOOL

(75) Inventors: Gang He, Quebec (CA); Gregory Walter Schinn, Quebec (CA)

(73) Assignee: EXFO Inc., Quebec (CA)

( * ) Notice: Subject to any disclaimer, the term of this patent is extended or adjusted under 35 U.S.C. 154(b) by 198 days.

(21) Appl. No.: 12/086,626

(22) PCT Filed: Dec. 18, 2006

(86) PCT No.: PCT/CA2006/002033
§ 371 (c)(1),
(2), (4) Date: Jun. 16, 2008

(87) PCT Pub. No.: WO2007/068111
PCT Pub. Date: Jun. 21, 2007

(65) Prior Publication Data
US 2009/0033919 A1 Feb. 5, 2009

Related U.S. Application Data

(60) Provisional application No. 60/750,830, filed on Dec. 16, 2005.

(51) Int. Cl.
*G01N 21/00* (2006.01)
(52) U.S. Cl. .................................... 356/73.1
(58) Field of Classification Search ....................... None
See application file for complete search history.

(56) References Cited

U.S. PATENT DOCUMENTS

| 4,372,768 | A | 2/1983 | Zucker et al. |
| 4,391,517 | A * | 7/1983 | Zucker et al. ............... 356/73.1 |
| 5,278,932 | A | 1/1994 | DeVeau, Jr. et al. |
| 5,471,342 | A | 11/1995 | Junginger et al. |
| 6,459,478 | B1 * | 10/2002 | Schmidt et al. ............ 356/73.1 |
| 6,816,661 | B1 | 11/2004 | Barnes et al. |
| 6,931,193 | B2 | 8/2005 | Barnes et al. |

OTHER PUBLICATIONS

Fujise et al., "Core alignments by a simple local monitoring method", Applied Optics, vol. 23, Issue No. 15, pp. 2643-2648, Aug. 1984.

* cited by examiner

*Primary Examiner*—Tu T Nguyen
(74) *Attorney, Agent, or Firm*—Thomas Adams (57) ABSTRACT

First and second optical fibers are spliced by a mechanical splice-based connecting device having a portion whereby light leaked from the splice can leave the connecting device. A reference power level ($P_{REF}$) of light leaked while only the first fiber is inserted into the connecting device, and a measured power level ($P_M$) light leaked while both fibers are inserted are measured. Insertion loss of the splice is derived from the measured power level ($P_M$), the measured reference power level ($P_{REF}$) and a calibration factor (C) previously obtained by using the same or substantially identical measuring apparatus and connecting device to measure a corresponding calibration input power level ($P'_{IN}$) and calibration reference power level ($P'_{REF}$) with only the first fiber inserted, and a calibration measured power level ($P'_M$) and output power level ($P'_F$) of light coupled into a second fiber after the second fiber has been inserted.

30 Claims, 4 Drawing Sheets

A. Lateral displacement
D. Axial displacement
B. Tilt
C. Angled cleave

ESTIMATING LOSS OF MECHANICAL SPLICES INTERCONNECTING OPTICAL FIBERS, AND CONNECTOR INSTALLATION TOOL

CROSS-REFERENCE TO RELATED APPLICATIONS

This application is derived from International (PCT) application No. PCT/CA2006/002033 filed 18 Dec. 2006 which claimed priority from U.S. provisional patent application No. 60/750,830 filed 16 Dec. 2005. The entire contents of each of these prior applications are incorporated herein by reference.

TECHNICAL FIELD

The invention relates to a method of, and apparatus for, estimating loss in splices interconnecting optical fibers, especially in mechanical splices interconnecting two fibers or in mechanical splice-based connectors for "connectorizing" a single fiber. The invention also relates to a connector installation tool incorporating such loss estimating apparatus.

BACKGROUND ART

It is often necessary to connect optical fibers end-to-end and various techniques have been developed for doing so while maintaining precise coaxial alignment of the fiber cores so as to keep connection (insertion) losses low. When the connection is to be made "in the field", for example between two previously-installed "field" fibers, a mechanical splice often is preferred, since it is generally much easier to perform a mechanical splice than a "fusion splice" in the field. Known such mechanical splices normally abut opposed ends of the optical fibers coaxially within the device, usually with index-matching material, e.g., a gel, between the opposed ends so as to improve matching. The fibers are retained in position by locking means at opposite ends of the body of the mechanical splice.

Where a fiber is to be "connectorized" by adding a connector to one end, a mechanical splice-based connector may be used which, in effect, constitutes one half of a mechanical splice device. Generally, such a mechanical splice-based connector comprises a ferrule through which one end portion of a fiber stub extends. The other end of the fiber stub is mechanically-spliced to the end of the fiber to be "connectorized". The term "mechanical splice-based connecting device" used herein embraces both mechanical splices and mechanical splice-based connectors.

When such a mechanical splice-based connecting device has been installed, it is desirable to be able to verify the quality of the splice, specifically by estimating the insertion loss attributable to the splice. Typically, the insertion loss must be measured to within 0.2 dB of actual measured insertion loss, preferably to within 0.1 dB average error, with a certainty of 95 percent. It is also desirable to be able to measure such insertion loss in a simple manner that can be used to check the integrity of field-installed mechanical splice-based connecting devices.

In one known type of field-installable mechanical splice-based connecting device, the connector body around the splice is translucent so that light leaking from the splice can emerge from the connecting device. It is known, when using such a connecting device that comprises a mechanical splice-based connector, to check the integrity of the splice after the fibers are "locked" into place by launching visible light into the splice by means of a jumper fiber attached to the ferrule of the connector, and observing the glow around the translucent body portion caused by light leaking from the splice. If the level of the glow is deemed to be excessive, the user may unlock and withdraw the fiber, and then repeat the steps to attempt to reduce the glow. If the glow is still excessive, the user will normally change the mechanical splice-based connector, re-cleave the fiber, and repeat the above steps. For more information about such connectors and the method of installing them, the reader is directed to U.S. Pat. Nos. 6,816,661 and 6,931,193, both of which name Barnes et al. as inventors. The contents of these patents are incorporated herein by reference.

A limitation of this "glow-observing" approach is that the determination of what is "dark" is very subjective, and its efficacy varies according to user experience and judgement and to ambient lighting conditions. Also, when connecting two field fibers by means of a mechanical splice, it may not be possible to inject light into the splice from a local light source, so it may be desirable to estimate the insertion loss using the "in-line" light signal propagating in the fiber(s). This light is not visible, however, and it is not straightforward to replace the human operator with an optical system which would capture and quantify the leaked light accurately, yet be simple and robust enough to use in the field.

Hereinafter, reference will be made to splices between first and second fibers, it being understood that the first and second fibers may be regular fibers, for example two field fibers, being spliced together by a mechanical splice, or a regular (e.g., field) fiber and a fiber stub of a mechanical-splice-based connector.

DISCLOSURE OF THE INVENTION

The present invention seeks to eliminate, or at least mitigate, the limitations and disadvantages of the known techniques, or at least provide an alternative.

According to a first aspect of the present invention, there is provided apparatus for determining insertion loss of a splice between first and second optical fibers made by a connecting device, for example a mechanical splice or a mechanical splice-based connector, having a portion whereby at least a part of light emanating from the first fiber can emerge from the connecting device, the apparatus comprising means for detecting light emanating from the first fiber, emerged from said portion, and collected at azimuthally symmetrically distributed positions about the axis of symmetry of the portion; and processing means coupled to the detecting means for calculating:

(a) a measured reference power level ($P_{REF}$) of the detected light when the second fiber is not inserted into the connecting device;

(b) a measured power level ($P_M$) of the detected light when the second fiber is inserted into the connecting device so as to abut or be in close proximity to the first fiber, thereby constituting a mechanical splice;

(c) a corresponding insertion loss of the splice from the said measured power level ($P_M$), said measured reference power level ($P_{REF}$) and a collection factor C representing a predetermined relationship between measured power level ($P_M$), predetermined power level ($P_{REF}$), power level ($P_{IN}$) of light in the first fiber, and output power level ($P_F$) of light coupled into the second fiber.

According to a second aspect of the present invention, there is provided a method of determining insertion loss of a splice between first and second optical fibers made by a connecting device, e.g., a mechanical splice or a mechanical splice-based connector, having a portion whereby light leaked from the splice can leave the connecting device, the method comprising the steps of collecting, at positions spaced angularly about a longitudinal axis of the connecting device, light that has leaked from the splice and emerged from the portion, detecting the collected light, and calculating a measured power level ($P_M$) of said collected light and deriving insertion loss of the splice from the measured power level ($P_M$), a measured reference power level ($P_{REF}$), and a collection factor (C) representing a predetermined relationship between measured power level ($P_M$), predetermined power level ($P_{REF}$), power level ($P_{IN}$) of light in the first fiber, and output power level ($P_F$) of light coupled into the second fiber.

According to a third aspect of the invention, there is provided a connecting device installation tool for splicing first and second fibers by means of a connecting device having a portion whereby at least a part of light leaked from the splice between respective opposed ends of the first and second optical fibers can emerge, the tool incorporating apparatus according to the first aspect of the invention.

In preferred embodiments of any of the three aspects of the invention, the "factory-calibrated" collection factor C may be predetermined for the same or a similar connecting device according to the equation $C=(1-P_F/P_{IN})/PR$, where power ratio PR is the ratio $P_M/P_{REF}$. Unlike the case for measurements "in the field", where one does not generally have means to measure $P_F$ and the direct measurement of $P_{IN}$ is often inconvenient, in the "factory environment" one can measure all four of the parameters $P_{IN}$, $P_{REF}$, $P_F$, and $P_M$ in a controlled manner.

The collection factor (C) may be approximately constant, being properly chosen to optimize the precision of the estimation over a limited range of insertion loss that is of interest; or may vary in dependence upon power ratio PR.

For field measurements, the light launched into the splice via the first fiber may be light normally propagating in the first fiber, in use, or light provided by a separate, local light source, conveniently in the power meter used to make the various power measurements. Generally, of course, a local light source will be used when the connecting device is a mechanical splice-based connector.

Preferably, the detecting means comprises light collecting means in the form of a multiplicity of ports, for example respective ends of a corresponding multiplicity of optical fibers, spaced apart symmetrically about said axis of symmetry, each port collecting a portion of said leaked light.

Respective opposite ends of the collecting fibers then may be connected, in common, to a detector of a power meter which integrates the light from the different collecting fibers to determine the power level of the leaked, emerged and collected light.

In preferred embodiments of any aspect of the invention, the insertion loss (IL) of the splice, defined as $10 Log(P_F/P_{IN})$, is calculated in accordance with the expression:

$$IL(dB)=10 Log(1=C \cdot PR)$$

where $P_F$ is the power level of the light coupled into the second fiber; $P_{IN}$ is the power level of the light in the first fiber, and PR is the power ratio ($P_M/P_{REF}$) between the measured power level ($P_M$) of the leaked and collected light after the second fiber has been inserted, with $P_{REF}$ being the measured power level when the second fiber is not inserted into the connecting device.

Preferably, the collection factor (C) is predetermined by measuring $P_{IN}$, $P_M$, $P_{REF}$ and $P_F$ for the or each connecting device type whose splice quality is to be determined, for known insertion losses having different values, and storing the collection factor values in a memory associated with the processor means so that the processor can access them when calculating the insertion loss. The processor may be programmed to select the appropriate values according to the connecting device whose insertion loss is being measured, conveniently based upon input from a user.

Various objects, features, aspects and advantages of the present invention will become more apparent from the following detailed description, taken in conjunction with the accompanying drawings, of a preferred embodiment of the invention, which is described by way of example only.

DESCRIPTION OF THE PREFERRED EMBODIMENTS

In the drawings, the same or corresponding items in different Figures have the same reference numeral.

The technique employed "in the field" to measure insertion loss of a connection device, i.e., a mechanical splice or mechanical splice-based connecting device, uses a collection or calibration factor C which is predetermined for that particular type of connecting device, specifically by injecting light into the connecting device before and after insertion of the second fiber and measuring power of input light, light leaked from the splice and emerging though the body of the connecting device and light entering the second fiber. When the collection factor then is used "in the field" to measure insertion loss for the same or a similar connecting device, only the power of the leaked, emerging light before and after insertion of the second fiber needs to be measured (i.e. $P_{REF}$ and $P_M$, respectively).

The nature of the insertion loss-inducing conditions and the determination of the collection factor for a particular connecting device type will be described first with reference to FIGS. 1A to 3.

Figure 1A:
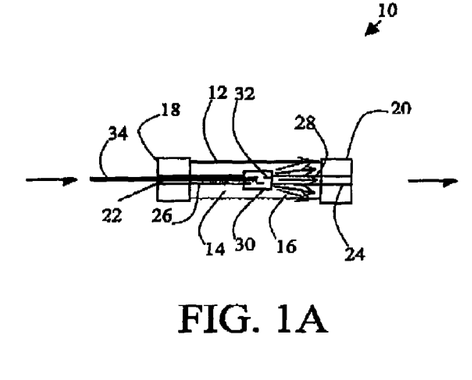
FIGS. 1A and 1B are simplified illustrations of a technique for observing leakage of light from a field-installable mechanical splice before and after termination to two field fibers.
Figure 1B:
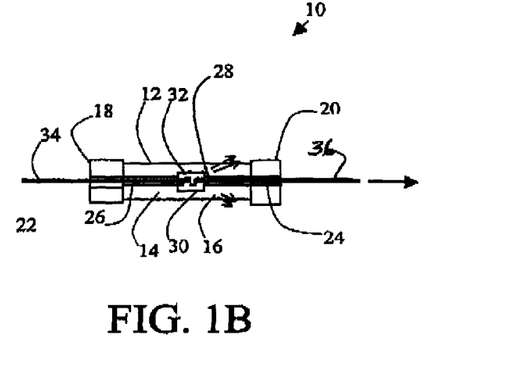

Referring to FIGS. 1A and 1B, a field-installable mechanical splice 10 comprises a tubular body 12 having two fiber-aligning tubes 14 and 16 each having a respective one of enlarged sections 18 and 20 at its distal end. Each of the enlarged sections 18 and 20 comprises locking means which is not shown in detail. The locking mechanisms may take any suitable known form, for example a spigot which can be crimped onto the jacket of the fiber.

Central holes 22 and 24 through the enlarged sections 18 and 20, respectively, communicate with the interior passages 26 and 28 of the tubes 14 and 16, respectively. At the middle of the tubular body 12, the passages 26 and 28 communicate with a central chamber 30 which contains index-matching gel 32. The index-matching gel 32 avoids air gaps between the opposed ends of the fibers 34 and 36, thereby improving the quality of the connection by reducing insertion loss and backscatter.

In use, the fibers 34 and 36 are inserted into the passages 26 and 28 so that their respective ends abut in chamber 30 (see FIG. 1B), whereupon the looking mechanisms are used to lock the fibers to the tabular body 12, thereby avoiding tensile forces upon the splice. The interiors of tubes 14 and 16 usually will have alignment means (not shown), for example grooves, for ensuring that the respective cores of the abutting fiber end sections are substantially coaxial. A portion of the tubular body 12, specifically comprising the tube 16 and the enlarged section 20, allows at least part of the light leaving the slice to emerge therethrough, i.e, the portion is translucent (or transparent), for reasons which will become clear later. The translucent portion should be azimuthally symmetric, so that emerging light from the splice will not be rendered azimuthally asymmetric on account of the nature of this translucent portion.

Figure 2A:
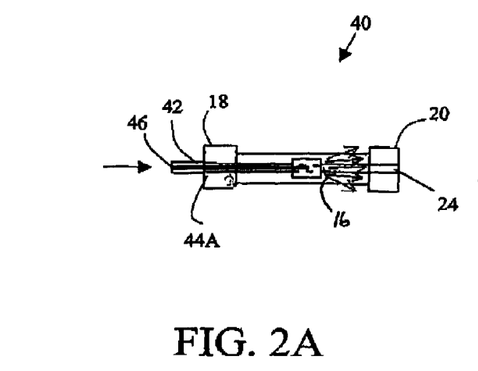
FIGS. 2A and 2B are simplified illustrations of a technique for observing leakage of light from a field-installable mechanical splice-based connector before and after termination to a field fiber.
Figure 2B:
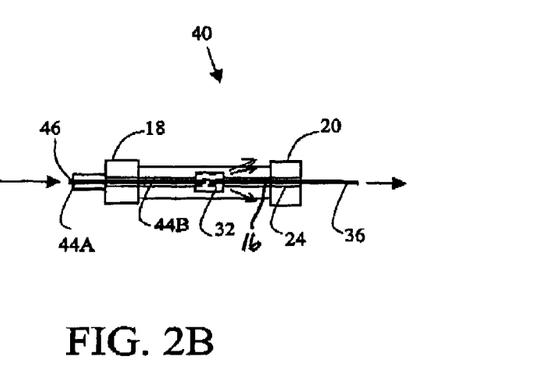
Figure 3:
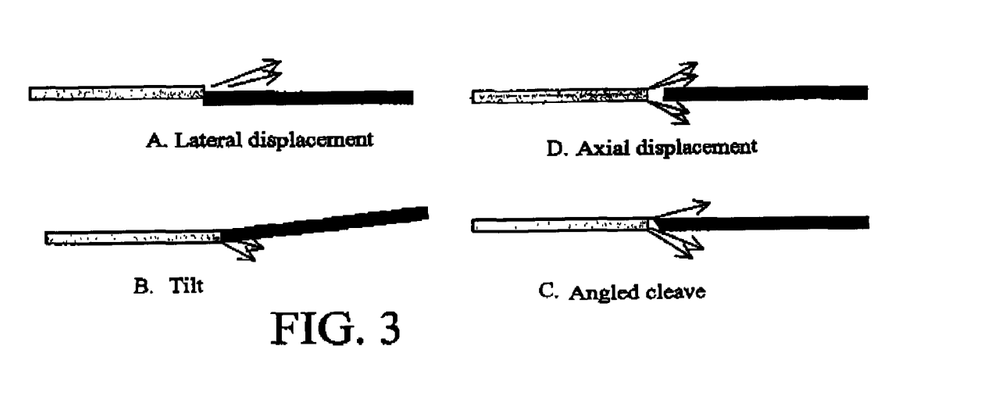
FIGS. 3A to 3D illustrate, respectively, different causes of loss attributable to a mechanical splice.

As shown in FIGS. 2A and 2B, a mechanical splice-based connector 40 for attaching to the end of a fiber to "connectorize" it, for example to allow it to be connected to another connectorized fiber, is similar to the in-line mechanical splice 10 of FIGS. 1A and 1B but, at one end, has a ferrule 42 protruding coaxially from the end of the enlarged locking means section 18. A short fiber 44 is permanently installed with a first portion 44A extending through a central hole of the ferrule 42 and a second fiber portion or fiber stub 44B extending through the adjacent tube 14 and into the index-matching gel 32 in chamber 30. The end face 46 of the ferrule 42 and the end of the fiber portion 44A are PC or APC polished in the usual way. In use, the end of the second fiber 36 will be prepared as described above and inserted through the tube 16 so that its end extends into the gel 32 and into substantial abutment with the opposed end of fiber stub 44B.

As illustrated in FIGS. 1A to 2B, the distribution of the light emerging from the translucent/transparent tubular section 16 when the second fiber 36 is in place can differ significantly from the light distribution when the second fiber 36 is not in place. Also, emerging light distributions corresponding to different "insertion-loss-inducing conditions" can be quite different.

FIGS. 3A to 3C illustrate some of the conditions which might lead to an asymmetrical azimuthal distribution of the leaked and emerging light. Thus, if the ends of the fibers 34 and 36 are laterally displaced, as shown in FIG. 3A, or tilted as shown in FIG. 3B, light will tend to leave from one side rather than the other. Likewise, if the end face of one of the fibers is angled relative to the opposed end face of the other fiber, as shown in FIG. 3C, the leaked and emerging light will also radiate in an azimuthally asymmetric fashion. On the other hand, if the end faces are cleaved perpendicularly, but spaced apart axially by too great a distance, as illustrated in FIG. 3D, there should be no induced azimuthal asymmetry in the distribution of the leaked and emerging light, at least in principle, but there will be increased insertion loss.

However, all four of the insertion-loss-inducing conditions shown in FIGS. 3A to 3D, respectively, will in general result in a non-uniform angular distribution of the emerging light with respect to the axis of symmetry of the tubular portion (i.e., with respect to the zenith, or "tilt", angle). The nature and degree of this non-uniform angular distribution will, in general, be different for each of the aforementioned insertion-loss-inducing conditions, and for a given condition, will depend on its severity (e.g., the degree of lateral displacement of the fibers).

Embodiments of the invention which take account of such non-uniformities will be described with reference to FIGS. 4A, 4B and 4C, which illustrate collecting means associated with a connecting device having a portion through which light can emerge. The collecting means collects light leaked from the connecting device and couples it to a large area photodetector 52 of a power meter 54. A similar set up will be used both to carry out in-factory calibration of such a collecting means to determine a collection factor C and, in-the-field, to measure insertion loss of a splice made by such a connecting device. Where the connecting device comprises a mechanical splice-based connector, the collecting means may be incorporated into a connector installation tool.

The collecting means for collecting the leaked and emerging light comprises a multiplicity (N) of optical ports which comprise respective ends of an army of optical fibers F1 to FN (see FIG. 4C) that are angularly-spaced apart around the translucent/transparent tubular body section 16. The fiber end portions are supported by an annular adapter 48 which is positioned with its innermost end face spaced a small distance d from the outermost end face of enlarged end section 20. Opposite end portions of the array of fibers F1 to FN are gathered together into a fiber bundle 50 and their ends coupled to the detector means 52 in power meter 54.

Figure 4A:
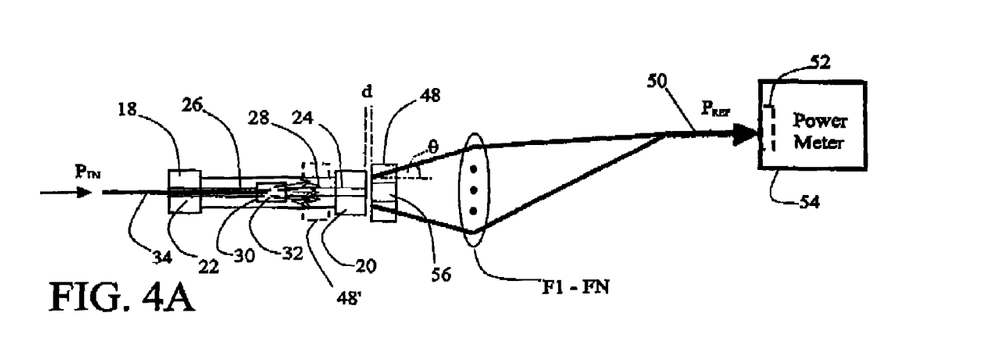
FIG. 4A illustrates, schematically, an embodiment of the present invention in the form of a mechanical splice for interconnecting two fibers, shown with only one fiber inserted.
Figure 4B:
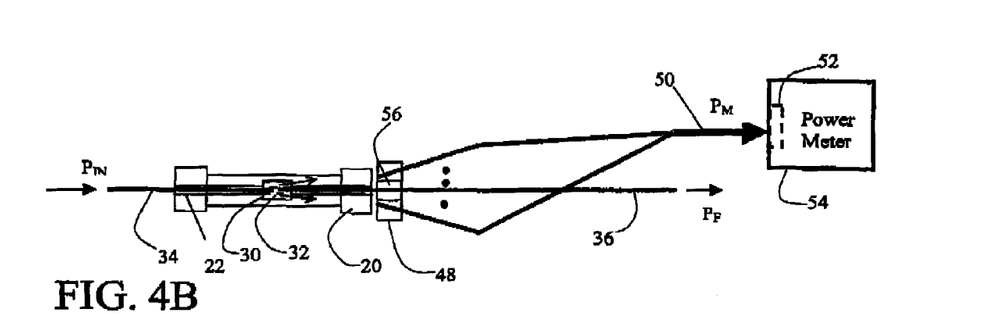
FIG. 4B is a view corresponding to FIG. 4A but with both fibers inserted.
Figure 4C:
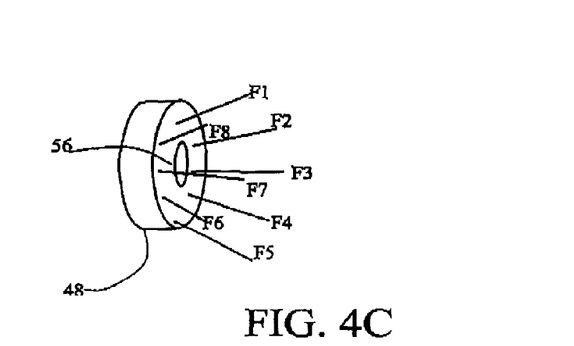
FIG. 4C is a pictorial view of part of the collecting means of FIG. 4A.

As shown in FIG. 4C, which shows only eight collection fibers for clarity of depiction, the collection fiber end portions project into, and are adhered to, through-holes (not shown) that are equally angularly spaced about the symmetrical axis of a central hole 56 through which the fiber 36 extends. The fiber end portions extend only part of the length of the adapter 48 so their respective ends, i.e., ports, are flush with the inner end face of the adapter 48 (defining an azimuthal plane perpendicular to the symmetrical axis of the fibers (34/44B, 36)) and at the same radial spacing from the centre of the hole 56 in the annular member.

The through-holes are inclined to the optical/longitudinal axis by an angle θ, so that the end portions of the array of collection fibers F1-FN diverge away from the translucent tube 16 at an acute angle relative to the tubular axis of the splice. The ends of the fibers F1-FN, being flush with the innermost end face, are polished flat with the end face. In this case, the angle of the through holes relative to the symmetrical axis will be about 23 degrees so that, as determined by the well-known Snell's law of refraction, the effective optical axis of each of the fibers F1 to FN will be inclined at an angle θ of about 36 degrees to the symmetrical axis of the spliced fibers 34, 44B, 36.

It is envisaged, however, that the ends of the collection fibers F1-FN could be set back slightly, for protection from accidental damage, providing that Me numerical aperture of each fiber is not restricted by the remaining part of the through hole. In this case, the ends of the fibers F1 to FN will probably be cleaved perpendicularly to the symmetrical axis of the fiber, in which case the angle of inclination of the through holes to relative the symmetrical axis will be the same as the effective optical axis.

It should be appreciated that the specific physical and optical inclination angles (23 degrees, 36 degrees) mentioned above may differ according to the geometry of the mechanical splice or connector. Also, they are not critical.

Even if the leaked light collected by each individual fiber is sensitive to "azimuthal asymmetry" of the leaking light integration (or summing of) the light collected by all of the fibers, by a common detector 52, will result in the measured power being substantially insensitive to the "azimuthal asymmetry" of the leaked light.

The calibration process to establish the collection factor for the particular connecting device type relies upon the basic definition of insertion loss (IL) for two interconnected fibers is IL (dB)=10 log($P_F/P_{IN}$), which can be measured by a standard test method (STM) by measuring the $P_{IN}$ at the "output" or proximal end of the first fiber 34 and $P_F$ at the "output" or distal end of second fiber 36. Such standard test methods are set out in IEC 1300-3-14 "Fibre optic interconnecting devices and passive components—Basic test and measurement procedures" and IEC 61280-4-2 "Fibre optic communication subsystem basic test procedures", both of which are incorporated herein by reference.

Thus, the power level $P_{IN}$ of the light in the first fiber 34 is measured by power meter 54, conveniently with a bare fiber connector temporally attached, following which the fiber 34 is inserted into the connecting device, as shown in FIG. 4A. At this stage, the second fiber 36 has not been inserted. The power level $P_{REF}$ of the light collected by the collecting means is measured and both $P_{IN}$ and $P_{REF}$ stored.

The second fiber 36, whose remote end is accessible in this "factory calibration" procedure, is inserted into the connecting device and the power meter 54 used to measure both the power level of the light $P_F$ captured by the second fiber 36 and the power level $P_M$ of the light which has leaked from the splice, emerged through the portion of the connecting device body and been collected by the collecting means. These measurements are used to calculate a collection factor which takes into account the configuration of the collecting means and its spacing from the splice.

The calibration process may be used to determine collection factors C for a variety of such connecting devices, and, optionally for the same device type, at different insertion loss values (e.g. corresponding to the two fibers not being perfectly abutted).

Subsequently, when the collecting means is used in-the-field to measure insertion loss of a particular connecting device type, it will be sufficient to measure $P_{REF}$ without the second fiber 36 inserted, then insert the second fiber and measure the power level $P_M$. These two readings, and the calibration collection factor C for that particular collecting means (type), will be used to calculate the insertion loss. Because $P_{IN}$ and $P_F$ need not be measured in-the-field, it is not necessary to have access to the remote end of either of the fibers 34 and 36.

Embodiments of the invention determine the relationship (or ratio PR) between $P_{IN}$ and $P_{LOSS}$, i.e., the light leaked from the splice, to find the relationship or ratio between $P_{IN}$ and $P_F$, that is find insertion loss IL, because, in practice, the power level $P_F$ in the second fiber 36 cannot be measured directly, for example because there is no access to the "output" or distal end of the second fiber 36. Thus, the processor takes account of the fact that the ratio PR is proportional to IL, as will be discussed in more detail below.

When estimating the insertion loss of a splice in a mechanical splice interconnecting two field fibers, as shown in FIGS. 1A, 1B, 4A, 4B, it may be desirable to use the existing "in-line" transmission light signal propagating in the fiber(s), which is not visible, to make the loss estimation, perhaps because the operator does not have access to inject test light into the field fiber.

When estimating the insertion loss of a splice in a mechanical splice-based connector, as shown in FIGS. 2A and 2B, the input light may be provided by a local light source and launched into the fiber 44A by means of a jumper connected to the ferrule 42. The light source may be in the power meter 54 and, preferably, supplies light having a wavelength that is the same as, or similar to, the wavelength of the light which will propagate through the splice when in use.

Once the light has been collected and converted to an electrical signal by the photodetector 52, a processor (not shown) in the power meter 54 will calculate the power level of the collected light. In order to calculate the insertion loss (IL) of the splice, the processor uses the measured power level $P_M$ of the collected light after insertion of the second fiber 36 and the reference power level $P_{REF}$ determined before insertion of the second fiber 36, together with a "factory-calibrated" collection factor C.

The reference power level $P_{REF}$ preferably is obtained by measuring the power level of the leaked light without fiber 36 inserted into the connecting device 10, using a procedure similar to that described above. It is envisaged, however, that the power level $P_{IN}$ of the light leaving the fiber 34 could be measured and used as reference power level $P_{REF}$, as will be described later.

The calculation of insertion loss (IL) on the basis of the measurement of leaked and collected light before and after insertion of the field fiber 36 will now be described.

Referring to FIGS. 4A and 4B, which depict the mechanical splice 10 before and after insertion of the second fiber 36, the integrated power levels $P_{REF}$ and $P_M$ of the light collected by the array of fibers F1 to FN are measured before and after, respectively, the output fiber 36 is inserted. In this case, the light carried by "input" fiber 34 will be the normal transmitted light signal, i.e. "in-line". The insertion loss (IL), defined as 10 Log ($P_F/P_{IN}$), of the splice (i.e., fiber-to-fiber connecting loss) is calculated by the (generalized) equation as;

$$IL(dB) = 10 \, \text{Log}(1 - C \cdot PR) \tag{1}$$

where power ratio PR=$P_M/P_{REF}$ is the ratio between the power level $P_M$ of the collected light measured after inserting the output fiber 36 and the power level $P_{REF}$ is determined before inserting the output fiber 36, either by measuring the light collected by the fibers F1 to FN before insertion of the output fiber 36, or, if convenient, by measuring the total power $P_{IN}$ of the light in the input fiber 34, using a bare fiber connector (not shown), before insertion of "input" fiber 34 into the connecting device 10.

It will be appreciated that the same light collection and detection arrangement (48, F1-FN, 50, 52, 54 in FIGS. 4A and 4B) can be used with a mechanical splice-based connector 40 of the kind shown in FIGS. 2A and 2B. In this case, the light used to make the insertion loss measurements may be injected by coupling the ferrule 42 to an existing connectorized fiber carrying transmission signal, or by connecting the ferrule to a suitable light source which could be in the power meter 54, or a separate unit.

Collecting factor C may be considered to be a ratio between two "light collecting efficiency factors" A and B, which is given by;

$$C = A/B \tag{2}$$

where A and B are light collecting efficiency factors for $P_{IN}$ and $P_{LOSS}$, respectively, which are given by:

$$A = P_{REF}/P_{IN}, \text{ and } B = P_M/P_{LOSS} \quad (3)$$

where $P_{LOSS} = P_{IN} - P_F$, i.e., the power of the light lost in or from the splice, i.e., which left the fiber 34 but did not couple into the fiber 36.

Thus, A is the ratio between the reference power level $P_{REF}$, determined before the second fiber was inserted and the splice was made, and the input light power level $P_{IN}$. The ratio B, however, is the ratio between the power level $P_M$ of the light measured by the power meter 54, and the power level $P_{LOSS}$ of the light lost in or from the splice. These light collecting efficiency factors A and B need not be measured since the collection factor C can be determined directly; they are discussed here to illustrate the relationship between collection factor C and the various power levels that are measured.

For a particular type of mechanical splice or mechanical splice-based connector, the collecting factor C can be predetermined according to the equation $$C = (1 - P_F/P_{IN})/PR \quad (4)$$

As discussed above, typically, the calibration procedure to determine collection factor C for a particular type of connecting device will be carried out "at the factory" or in a laboratory, perhaps by the manufacturer, by measuring $P_{IN}$, $P_M$, $P_{REF}$ and $P_F$ for a sample of that type of connecting device and either the actual collecting means to be used in-the-field or, if the manufacturing yield of the splicing tools is sufficiently uniform, an identical sample.

For a particular type of connecting device, different collection factors C may be determined for different ranges of insertion loss values. The collection factors then will be stored in a memory in the power meter 54 for use by the processor, which may prompt the operator to select the collection factor(s) for the particular connecting device being used. Of course, the memory may store collection factor values for several different types of connecting device.

Because the loss calculation model (equation (1)) takes the different light collecting efficiencies into account by means of the collecting factor C (=A/B), high precision loss estimation can be obtained while using a simple light collecting and detecting system which collects only part of the light leaked from the splice and does not require knowledge of $P_F$, the light coupled into the second fiber 36. Furthermore, it is possible for light collecting efficiency factor B to vary somewhat with IL (or $P_{LOSS}$). In many cases, the collection factor C can be approximately constant, being properly chosen to optimize the precision of the estimation over a limited range of insertion loss that is of interest. Alternatively, the collection factor C can be properly chosen as a function of power ratio PR so as to optimize the estimation precision over a wide range of insertion loss IL, by taking into account the fact that the PR is proportional to IL.

Because the collection factor C is independent of the "insertion-loss-inducing conditions" or "asymmetrical variations of $P_{LOSS}$ distribution" (see FIGS. 3A to 3D) good estimation precision is facilitated. The symmetrical distributed fan-out multi-fiber light collecting and detection system F1 to FN provides good performance in terms of insensitivity of factor C to these "insertion-loss-inducing conditions" and advantageously affords low cost and flexibility to integrate with various splice types and their assembly tools.

Figure 5:
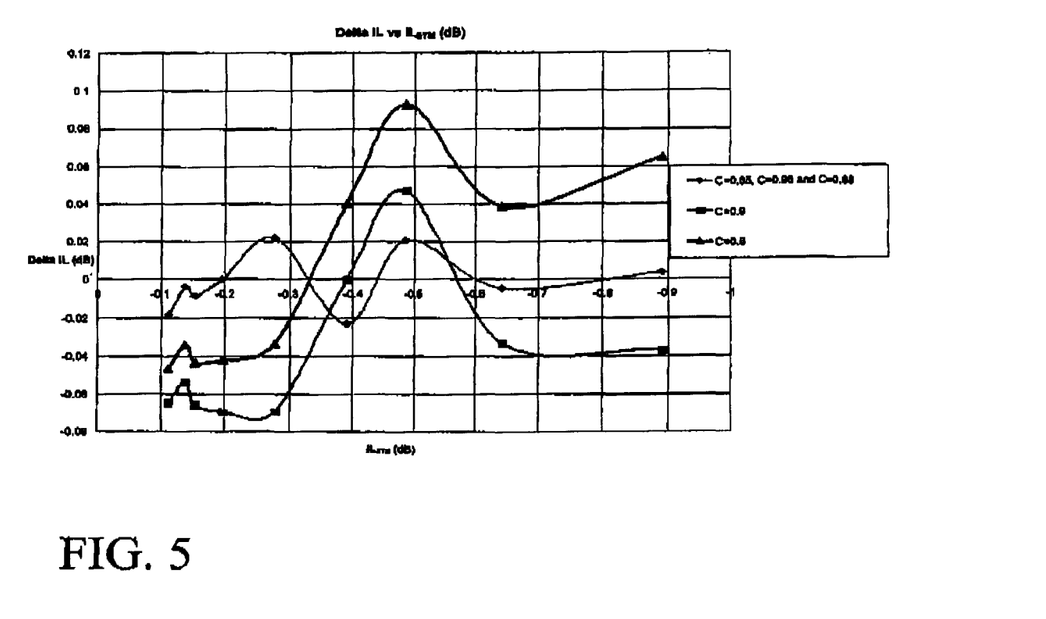
FIG. 5 is a graph of insertion loss difference (Delta IL) versus insertion loss ($IL_{STM}$) measured by the standard method for different values of a collection factor C.

As an example, FIG. 5 shows experimental results of insertion loss estimation of a mechanical splice-based SC connector using the multiple fiber "fan-out" collection and detection system of FIG. 4A with θ=36 degrees, d=1 mm and the number of fibers N=8). The parameter "$IL_{STM}$" shown in FIG. 5 is the insertion loss (in dB) obtained, as mentioned above, by measuring $P_{IN}$ and $P_F$ directly, using the Standard Test Method (STM), as $$IL_{STM} = 10 \log(P_F/P_{IN}) \quad (5)$$

The insertion loss difference (Delta IL) is the residual between the measured insertion loss $IL_{STM}$ and the insertion loss IL estimated by equation (1) (i.e., using C and PR as described hereinbefore.)

FIG. 5 shows the insertion loss difference (Delta IL) between the insertion loss $IL_{STM}$ measured using the Standard Test Method (STM) and the insertion loss (IL) determined as described above, as a function of $IL_{STM}$. Two of the curves correspond to, respectively, collecting factors C=0.8 and C=0.9 (i.e., where C is constant with respect to insertion loss). The third curve corresponds to multiple collection actors C (C=0.65; 0.88; 0.96) that vary in a piecewise manner with IL. It is noted that embodiments of the invention measure directly the ratio PR=($P_M/P_{REF}$), which ratio is proportional to the insertion loss (IL) of the splice, and deduce the insertion loss therefrom. It should also be noted that collection factor C could vary continuously rather than piecewise.

FIG. 5 shows that the precision (smaller Delta IL) can be optimized for different ranges of insertion loss (or IL measured) by properly choosing the C-factor (see the curves for C=0.9 and C=0.8). Varying the C-factor in a piecewise manner with PR that is directly proportional to the insertion loss (IL) of the splice, however, allows the precision to be improved over the whole insertion loss range (0.1 to 0.9 dB).

It should be noted that, for all three cases, uncertainties of the insertion loss estimated according to the present invention were less than 0.1 dB. Moreover, by judicious choice of collecting factor C, the precision can be concentrated in a particular range of interest. For example, one might desire high precision for insertion loss less than 0.5 dB and lesser precision for insertion loss greater than 0.5 dB on the grounds that any connection exhibiting an insertion loss greater than 0.5 dB would be unacceptable in any case.

Furthermore, the precision of loss estimation can be improved by calibrating C as a function of the power ratio PR, because the part of collection factor C that is attributable to light collecting factor B can vary with the insertion loss (or fraction of light emerging from the connector tubular section 16) for a given ("less than perfect") light collecting system. In other words, as the end of the second fiber 36 (to be terminated) approaches the end of the first fiber 34 or fiber stub 44B, the distribution of the collected light can change.

It should be appreciated that the length and position of the transparent/translucent portion may differ depending upon the position of the splice relative to the ports. In fact, either or both of the tube 16 and the enlarged section 20 may be translucent/transparent depending upon the positioning of the array of ports, i.e., respective ends of the array of fibers F1 to F8. For example, the enlarged section 20 need not be transparent/translucent if the array of ports is disposed closer to the chamber 30, perhaps by disposing the adapter 48 around the tube 16. Thus, the annular support 48 could be around the tube 16, as shown in broken lines at 48' in FIG. 4A, or even incorporated into the enlarged section 20.

The annular support 48 may have a slot (not shown) extending from the central hole 56 to an outer edge, allowing the second fiber 36 and connecting device 10/40 to be slid laterally into position in the annular support 48 and removed after the measurements have been made. Additionally or alternatively, the annular support 48 may comprise two parts that are hinged or clipped together around the fiber 36 or connecting device 10/40.

It should be appreciated that although the above-described embodiment has a small air gap between the juxtaposed end faces of the annular support 48 and the enlarged section 20, the space might be occupied by a transparent spacer, for example a glass plate, adhered to the annular member 48.

The derivation of the collecting factor C, where C≠1, is a particularly advantageous feature of embodiments of the present invention because it allows the light collecting system to be simplified and facilitates accurate loss estimation. Collection factor C can be either a predetermined constant or a pre-calibrated function of power ratio PR, the choice depending upon requirements of precision and simplification. It can be found by means of Equation (4) for a given system. In FIG. 5, the "multi-C" curve is an example of a simple function of C with PR or insertion loss. It should be appreciated that the pre-calibrated function could be piecewise, as described hereinbefore, or continuous.

It is envisaged that different collection factors and insertion losses could be measured for a particular connector and the variation of collection factor with respect to insertion loss plotted. The collection factor used by the processor then could be selected from the curve using an insertion loss value at which optimum accuracy is desired.

Figure 6:
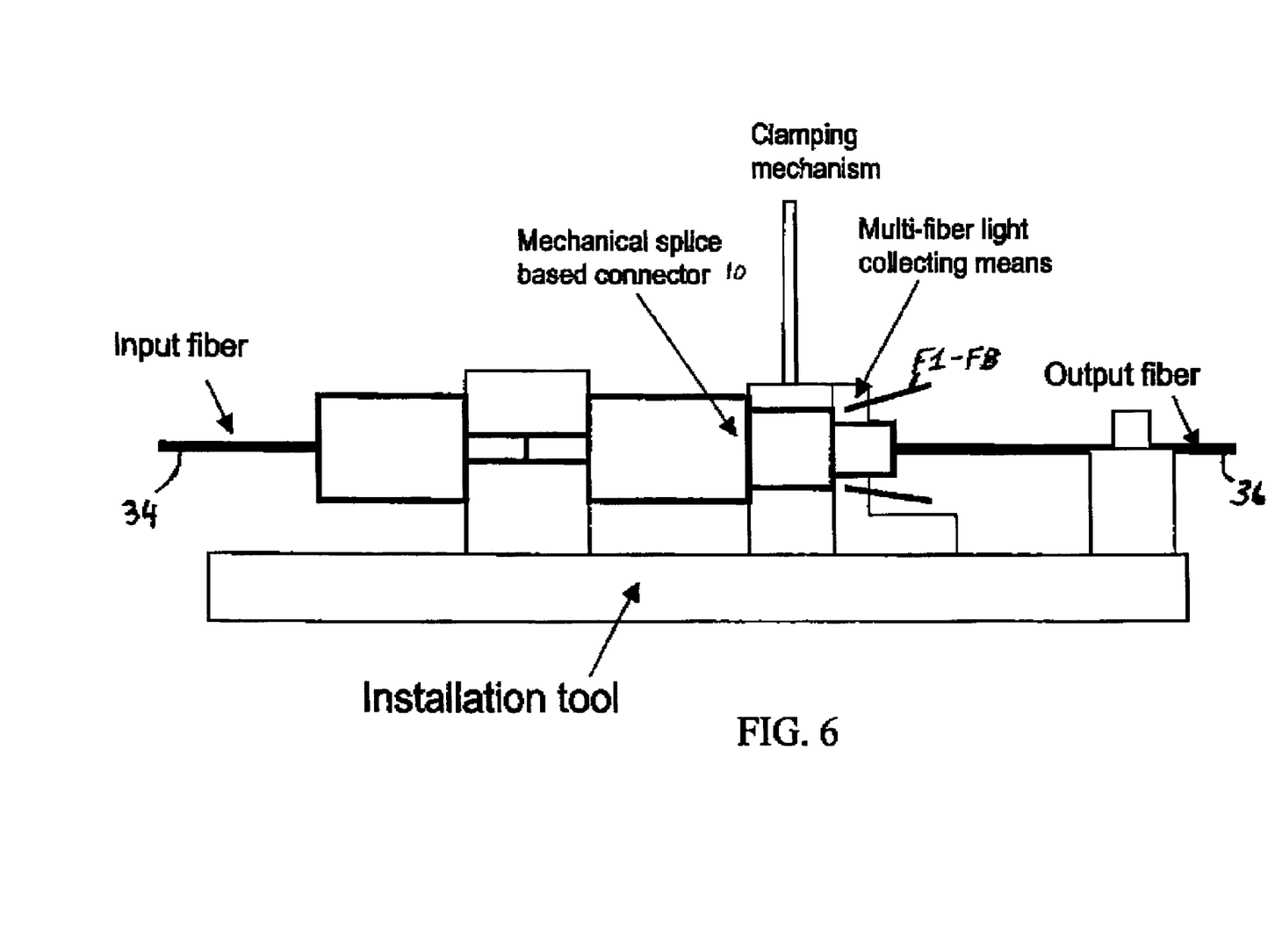
FIG. 6 illustrates schematically a connector installation tool incorporating a light collection device embodying the invention.

Multi-port light collecting systems embodying the present invention are compact, low cost and, as illustrated schematically in FIG. 6, can be integrated readily into installation tools, such as that disclosed in U.S. Pat. No. 6,931,193, to which the reader is directed for reference and the contents of which are incorporated herein by reference. They can be suitably modified to exhibit good insensitivity to the "azimuthal asymmetry" of light leaked from the splice. It is important to collect as much leaked light as possible to reduce the sensitivity requirement on the power meter or power level required for the light source, where applicable, which can be done with a plurality of large-core fibers having large numerical apertures. Consequently, it is preferable for the collecting fibers to be multimode fibers. Also, as a general rule, the more fibers/ports that are used, the better is the overall performance of the system.

In practice, it is preferable to use collecting fibers with core diameters of about 100-300 micrometers and a port/fiber count (N) of 8 to 16, a number both appropriate for use with a 2-mm detector (e.g. made from germanium (Ge) or indium gallium arsenide (InGaAs) for detection at wavelengths that are widely used in telecommunications, for example 1310 nm and 1550 nm) for the power meter and for retaining a compact design compatible with subsequent integration into a connector installation tool.

The "effective optical" zenith angle θ (shown in FIG. 4A) can be any angle between 0 and 90 degrees, but experimental results indicate that a zenith angle falling within the range of about 10 degrees to about 50 degrees is optimum for collecting a significant fraction of the leaked/emerging light.

It is envisaged that the predetermined power level $P_{REF}$ need not be obtained by measuring the leaked light immediately prior to inserting the second fiber 36 but might be the power level $P_{IN}$ of the light in the first fiber 34.

It is envisaged that the detection means 52 could comprise a multiplicity of detectors each connected to a subset of the multiplicity of fibers F1 to FN so as to allow the light from each subset of fibers to be measured independently. This would allow the distribution of the light in the azimuthal plane, i.e., the nature of the asymmetry, to be determined, facilitating diagnosis of the cause of excessive leakage of light at the splice. It should be noted that the subset could comprise one fiber.

It should be appreciated that the present invention is applicable to the measurement of insertion loss of splices between single mode fibers or multimode fibers.

Usually, the portion of the connecting device 10/40 through which the leaked light emerges will exhibit point symmetry, i.e., the degree of transparency either does not vary as a function of azimuthal angle (about the splice or connector axis), or varies in a uniform or symmetrical fashion.

As mentioned above, sometimes, the first fiber 34 will not be propagating light signals, so the apparatus may further comprise light source means for launching light into the first fiber to cause the required leakage at the splice. The light source means may be of the kind which injects light at a bend in the fiber or, where a field-installable mechanical splice-based connector is being used, a light source which can be coupled to the ferrule of the connector by a suitable jumper. In either case, the light launched into the first fiber preferably has a wavelength that is the same as, or similar to, the wavelength of light to be carried by the fiber in normal operation, e.g., 1310 nm or 1550 nm.

INDUSTRIAL APPLICABILITY

Advantageously, preferred embodiments of the different aspects of the present invention compensate for the fact that the distribution of the leaked and emerging light (glow) is not necessarily either azimuthally symmetrical (i.e., about the axis of symmetry of the fiber/portion) or uniformly distributed as a function of the zenith angle with respect to the axis of symmetry, this asymmetry or non-uniformity varying generally as a function of insertion loss as, for instance, the spacing between the abutted ends of the fibers changes.

Embodiments of the present invention may yield significant advantages in terms of high precision of loss estimation by means of a low cost light collection and detection system which is (potentially) flexible and easy to be adapted to various mechanical splice types, mechanical splice-based installable connector typos, and their assembly tools. Embodiments of the invention allow the mechanical-splice insertion loss to be estimated "in the field" to better than the required accuracy of within 0.2 dB of actual measured insertion loss; indeed, in practice, insertion loss-estimation accuracy of 0.1 dB or better has been achieved.

A significant advantage of the simple configuration of the insertion loss determining apparatus embodying the present invention is that it can be easily incorporated into a connector installation tool.

Another advantage is that the effect of ambient light is substantially reduced, even minimized, which is important because the leaked light to be collected and detected can be very weak, especially if the mechanical splice has low insertion loss, so good isolation from ambient light is desirable in order to facilitate high measurement precision.

Generally, preferred multi-port insertion loss determining systems embodying the present invention have the following advantages over previously-known approaches:

a) Insensitivity to asymmetry of leaked light or "causes of loss" because they measure total light power at multiple points located symmetrically around the fiber junction region of the connector;

b) Good isolation from ambient light, without needing complex shielding, particularly where optical fibers are used to collect the light, each of which only collects light falling within the angle defined by its numerical aperture (N.A.);

c) Ease of integration into an installation tool; and d) Low cost.

The invention claimed is:

1. Apparatus for determining insertion loss of a mechanical splice between first and second optical fibers (34,36; 44B,36) made by a connecting device (10;40) having a portion (16,20) whereby at least a part of light launched into the splice via the first fiber and leaked from the splice can emerge, the apparatus comprising:
   collecting means (F1-F8) configured for collecting at azimuthally symmetrically distributed positions about the axis of symmetry of the portion light which has emerged from said portion,
   detection means (52) for detecting the collected light; and
   means (54) coupled to the detection means (52) for measuring power levels of the collected and detected light,
   the measuring means (54) being arranged to measure and store a reference power level ($P_{REF}$) of light collected while only the first fiber is inserted into the connecting device, and a measured power level ($P_M$) of light collected while respective ends of the first and second fibers are abutted within the connecting device, and to derive insertion loss of the splice from the measured power level ($P_M$), the measured reference power level ($P_{REF}$) and a calibration factor (C) previously obtained by using the same or substantially identical apparatus and connecting device to measure power level ($P'_{IN}$) of light in a first fiber, a calibration reference power level ($P'_{REF}$) with only the first fiber inserted, and a calibration measured power level ($P'_M$) and output power level ($P'_F$) of light coupled into a second fiber after such second fiber has been inserted.

2. Apparatus according to claim 1, wherein the previously obtained calibration factor (C) is predetermined for the same or substantially identical aiwaratus and connecting device according to the equation $$C=(1-P'_F/P'_{IN})/PR$$

where power ratio PR is the ratio $P'_M/P'_{REF}$.

3. Apparatus according to claim 2, wherein the calibration factor (C) is approximately constant over a limited range of insertion loss that is of interest, being properly chosen to optimize the precision of the estimation over that range.

4. Apparatus according to claim 2, wherein the calibration factor (C) varies in dependence upon power ratio PR.

5. Apparatus according to claim 1, wherein the measuring means (54) is arranged to use as said reference power level ($P_{REF}$) a total power level of light leaving the first fiber measured directly by means of a power meter or the like connected directly thereto.

6. Apparatus according to claim 1, wherein said collecting means comprises a multiplicity of ports angularly spaced apart about an axis of symmetry of the portion (16;20).

7. Apparatus according to claim 6, wherein the ports comprise respective proximal ends of a multiplicity of optical fibers (F1-F8) whose distal ends are connected, in common, to a said detection means (52) of a power meter (54) which integrates the light from the different fibers to determine the power level of the leaked, emerged and collected light.

8. Apparatus according to claim 7, wherein the detection means (52) comprise a plurality of detectors each for detecting light received by a subset of at least one of said ports.

9. Apparatus according to claim 6, wherein the ports comprise respective ends of a multiplicity of collection fibers (F1-F8) and the axis of symmetry of each of the collection fibers is inclined to the axis of symmetry of said portion (16;20) by an effective optical inclination angle ($\theta$) in the range from about 10 degrees to about 50 degrees.

10. Apparatus according to claim 9, wherein respective proximal ends of the collection fibers (F1-F8) are polished at such an angle that the end face of each fiber lies in a plane substantially perpendicular to the axis of symmetry of said portion and the collection fibers are inclined at a physical inclination angle less than the optical inclination angle ($\theta$), the relationship between these angles being determined by Snell's law.

11. Apparatus according to claim 9, wherein respective proximal ends of the collection fibers (F1-F8) are each substantially perpendicular to the axis of symmetry of the fiber and the fibers are inclined relative to the axis of symmetry of said portion by a physical inclination angle equal to the optical inclination angle.

12. Apparatus according to claim 1, wherein the calculating means (54) is arranged to calculate the insertion loss (IL) with the first and second fibers spliced within the device (10;40) in accordance with the expression:

$$IL(dB)=10 \text{ Log}(1-C \cdot PR)$$

where the calibration factor C is predetermined by calibrating the same or substantially identical apparatus and connecting device according to the equation $$C=(1-P'_F/P'_{IN})/PR$$

where rower ratio PR is the ratio $P'_M/P'_{REF}$.

13. Apparatus according to claim 1, further comprising light source means for launching said light into said first fiber.

14. Apparatus according to claim 13, for measuring insertion loss of a splice in a mechanical splice-based connector, wherein the light source means comprises a light source and means for coupling said light source to a ferrule of the connecting device.

15. Apparatus according to claim 13, wherein the launched light has a wavelength approximately equal to the wavelength of light to be propagated by the fibers during normal operation.

16. A method of determining insertion loss of a splice between first and second optical fibers made by a mechanical splice-based connecting device having a portion whereby at least a part of light leaked from the splice can leave the connecting device, the method comprising the steps of collecting, at positions spaced angularly about axis of symmetry of the portion, light that has leaked from the splice and emerged from the portion, detecting the collected light and measuring and storing a corresponding power level ($P_{REF}$) of light collected while only the first fiber is inserted into the connecting device, and a measured power level ($P_M$) of light collected while respective ends of the first and second fibers are abutted within the connecting device, and to derive insertion loss of the splice from the measured power level ($P_M$), the measured reference power level ($P_{REF}$) and a calibration factor (C) previously obtained by using the same or substantially identical apparatus and connecting device to measure power level ($P'_{IN}$) of light in a first fiber, a calibration reference power level ($P'_{REF}$) with only the first fiber inserted, and a calibration measured power level ($P'_M$) and output power level ($P'_F$) of light coupled into a second fiber after such second fiber has been inserted.

17. A method according to claim 16, further comprising a prior step of determining the calibration factor C for the same or substantially identical apparatus and connecting device according to the equation $$C=(1-P'F/P'_{IN})/PR$$

where power ratio PR is the ratio $P'_M/P'_{REF}$, and $P'_F$ and $P'_{IN}$ are, respectively, the power level of the light coupled into the second fiber and the power level of the light in the first fiber during calibration.

18. A method according to claim 17, wherein the calibration factor (C) is properly chosen to optimize precision of said determination of insertion loss for a limited range of insertion loss of interest over which the insertion loss is approximately constant.

19. A method according to claim 17, wherein the calibration factor (C) varies in dependence upon power ratio (PR).

20. A method according to claim 16, wherein the step of deriving insertion loss of the splice uses as said reference power level ($P_{REF}$) a total power level of light leaving the first fiber measured directly by means of a power measuring means connected directly to said first fiber.

21. A method according to claim 16, wherein the collected light is collected by means of a multiplicity of ports angularly spaced apart around an axis of symmetry of the portion.

22. A method according to claim 21, wherein the light from the different ports is integrated to determine the power level of the leaked, emerged and collected light.

23. A method according to claim 21, wherein the collected light is collected by a plurality of detectors each for detecting light received from a subset of at least one of said ports.

24. A method according to claim 16, wherein the insertion loss (IL) with the first and second fibers spliced within the device is calculated in accordance with the expression:

$$IL(dB) = 10 \, Log(1 - C \cdot PR)$$

where the calibration factor C is predetermined for the same or substantially identical apparatus and connecting device according to the equation $$C = (1 - P'_F/P'_{IN})/PR$$

where power ratio PR is the ratio $P'_M/P'_{REF}$.

25. A method according to claim 16, further comprising the step of launching said light into said first fiber by means of light source means.

26. A method according to claim 25, for measuring insertion loss of a splice in a mechanical splice-based connector having a ferrule, wherein the light source means comprises a light source and means for coupling said light source to said ferrule.

27. A method according to claim 25, wherein the launched light has a wavelength approximately equal to the wavelength of light to be propagated by the fibers during normal operation.

28. A connecting device installation tool for splicing first and second fibers (34,36;44B,36) by means of a connecting device (10;40) having a portion (16,20) whereby at least a part of light leaked from the splice between respective opposed ends of the first and second optical fibers can emerge, the tool comprising integral apparatus for determining insertion loss of the splice, the apparatus comprising means (F1-F8,52) for detecting light leaked from the splice, emerged from said portion, and collected at azimuthally symmetrically distributed positions about the axis of symmetry of the portion while respective ends of the first and second fibers are abutted within the connecting device; and means (54) coupled to the detection means for calculating a measured power level ($P_M$) of light collected while respective ends of the first and second fibers are abutted within the connecting device and deriving insertion loss of the splice from the measured power level ($P_M$), a predetermined power level ($P_{REF}$) and a calibration factor (C) representing the relationship between measured power level ($P_M$), a predetermined power level ($P_{REF}$), power level ($P_{IN}$) of light in the first fiber, and output power level ($P_F$) of light coupled into the second fiber.

29. Apparatus for determining insertion loss of a mechanical splice between first and second optical fibers made by a connecting device having a portion whereby at least part of light launched into the splice via the first fiber and leaked from the splice can emerge, the apparatus comprising collecting means (F1-F8) configured for collecting at azimuthally symmetrically distributed positions about the axis of symmetry of the portion light which has emerged from said portion, detection means (52) for detecting the collected light; and means (54) coupled to the detection means (52) for measuring rower levels of the collected and detected light, the measuring means (54) being arranged to measure and store a reference power level ($P_{REF}$) of light collected while only the first fiber is inserted into the connecting device, and a measured power level ($P_M$) of light collected while respective ends of the first and second fibers are abutted within the connecting device, and to derive insertion loss of the splice from the measured power level ($P_M$), the measured reference power level ($P_{REF}$) and a calibration factor (C) previously obtained by using the same or substantially identical apparatus and connecting device to measure power level ($P'_{IN}$) of light in a first fiber a calibration reference power level ($P'_{REF}$) with only the first fiber inserted, and a calibration measured power level ($P'_M$) and output power level ($P'_F$) of light coupled into a second fiber after such second fiber has been inserted, the collecting means being configured spatially so as to compensate for distribution of the leaked and emerging light that is not necessarily azimuthally symmetrical about the axis of symmetry of the second fiber at or near the splice.

30. A connector installation tool for installing onto an optical fiber an optical connecting device having a portion (16,20) whereby at least a part of light launched into the splice via the first fiber and leaked from the splice can emerge, the installation tool incorporating apparatus for determining insertion loss of a mechanical splice between first and second optical fibers (34,36; 44B,36) made by a connecting device (10;40) having a portion (16,20) whereby at least a part of light launched into the splice via the first fiber and leaked from the splice can emerge, the apparatus comprising:

means (F1-F8) configured for collecting at azimuthally symmetrically distributed positions about the axis of symmetry of the portion light which has emerged from said portion, detection means (52) for detecting the collected light; and means (54) coupled to the detection means (52) for measuring power levels of the collected and detected light, the measuring means (54) being arranged to measure and store a reference power level ($P_{REF}$) of light collected while only the first fiber is inserted into the connecting device, and a measured power level ($P_M$) of light collected while respective ends of the first and second fibers are abutted within the connecting device, and to derive insertion loss of the splice from the measured power level ($P_M$), the measured reference power level ($P_{REF}$) and a calibration factor (C) previously obtained by using the same or substantially identical apparatus and connecting device to measure power level ($P'_{IN}$) of light in a first fiber, a calibration reference power level ($P'_{REF}$) with only the first fiber inserted, and a calibration measured power level ($P'_M$) and output power level ($P'_F$) of light coupled into a second fiber after such second fiber has been inserted.

\* \* \* \* \*